Jan. 3, 1950  M. A. ADAMS  2,493,099
ELEVATING DEVICE FOR RAISING GIN POLES ON TRUCKS
Filed Oct. 10, 1947  2 Sheets-Sheet 1
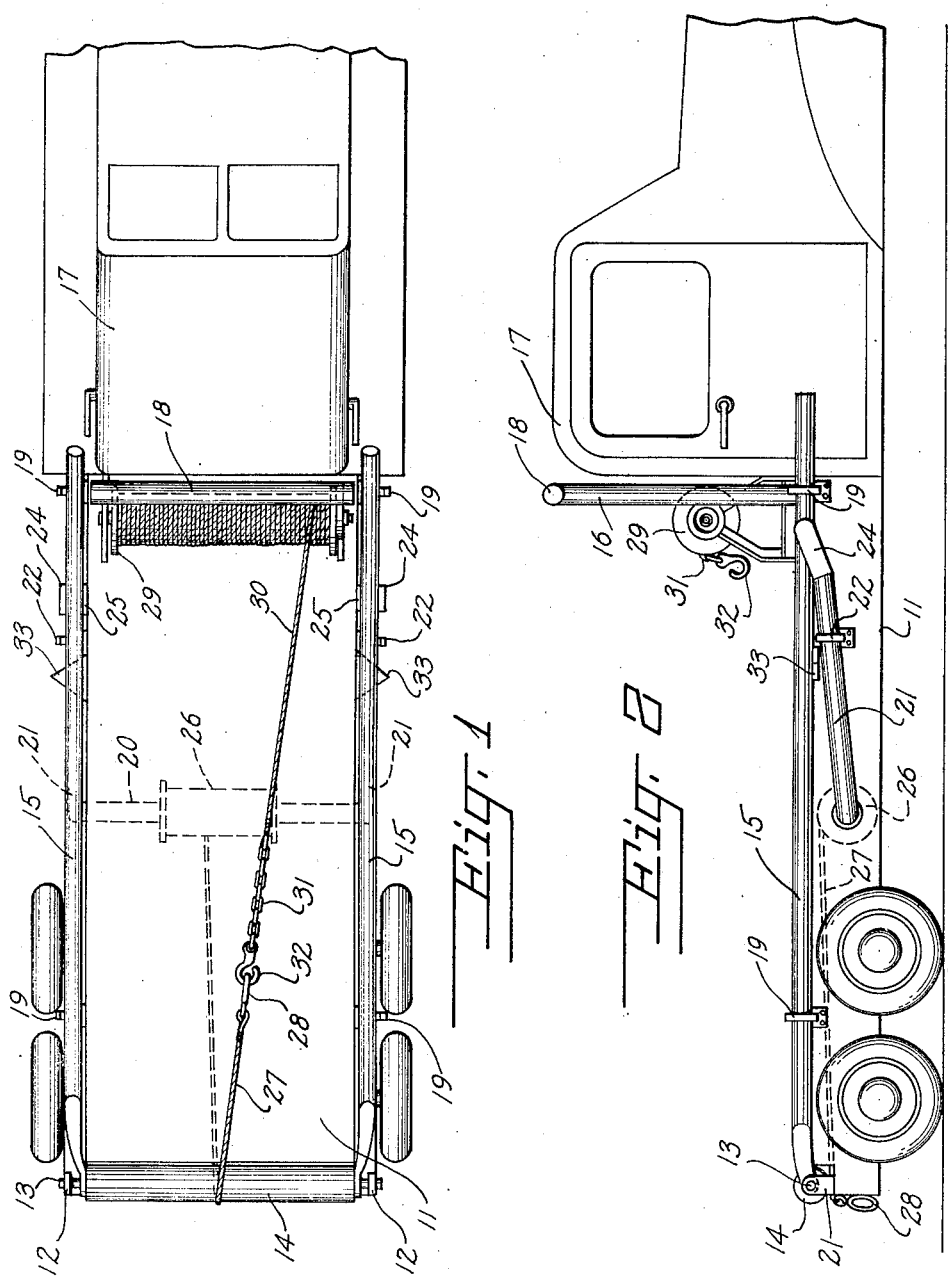
INVENTOR.
Mozel A. Adams
BY
McMorrow, Berman & Davidson
Attorneys Jan. 3, 1950 M. A. ADAMS 2,493,099
ELEVATING DEVICE FOR RAISING GIN POLES ON TRUCKS
Filed Oct. 10, 1947 2 Sheets-Sheet 2

INVENTOR.
Mozel A. Adams
BY
McMorrow, Berman + Davidson
Attorneys

Patented Jan. 3, 1950

2,493,099

UNITED STATES PATENT OFFICE 2,493,099

ELEVATING DEVICE FOR RAISING GIN POLES ON TRUCKS

Mozel A. Adams, Evangeline, La., assignor of one-half to Carroll V. Radke, Jennings, La.

Application October 10, 1947, Serial No. 779,067

6 Claims. (Cl. 214—77)

This invention relates to article and material handling devices, and more particularly to the structure for raising the gin poles of a truck-mounted traversing hoist.

A main object of the invention is to provide a novel and improved elevating device for raising the gin poles of a traversing hoist, said device eliminating the hazards of raising the gin poles by hand and substantially reducing the amount of time required to raise said gin poles.

A further object of the invention is to provide an improved mechanism for elevating the gin poles of a truck-mounted hoist device, said mechanism being very simple in construction, operating automatically to move the gin poles inwardly onto the headache rack of the hoist truck as they are raised, and involving relatively inexpensive parts.

Further objects and advantages of the invention will become apparent from the following description and claims, and from the accompanying drawings, wherein:

Figure 1 is a top plan view of the body portion of a truck having gin poles mounted thereon and employing elevating means for raising said gin poles constructed in accordance with the present invention, the gin poles being shown in partly raised positions supported at the sides of the truck body.

Figure 2 is a side elevational view of the structure disclosed in Figure 1, showing the gin poles supported at the sides of the truck body in inoperative positions.

Figures 3, 4:
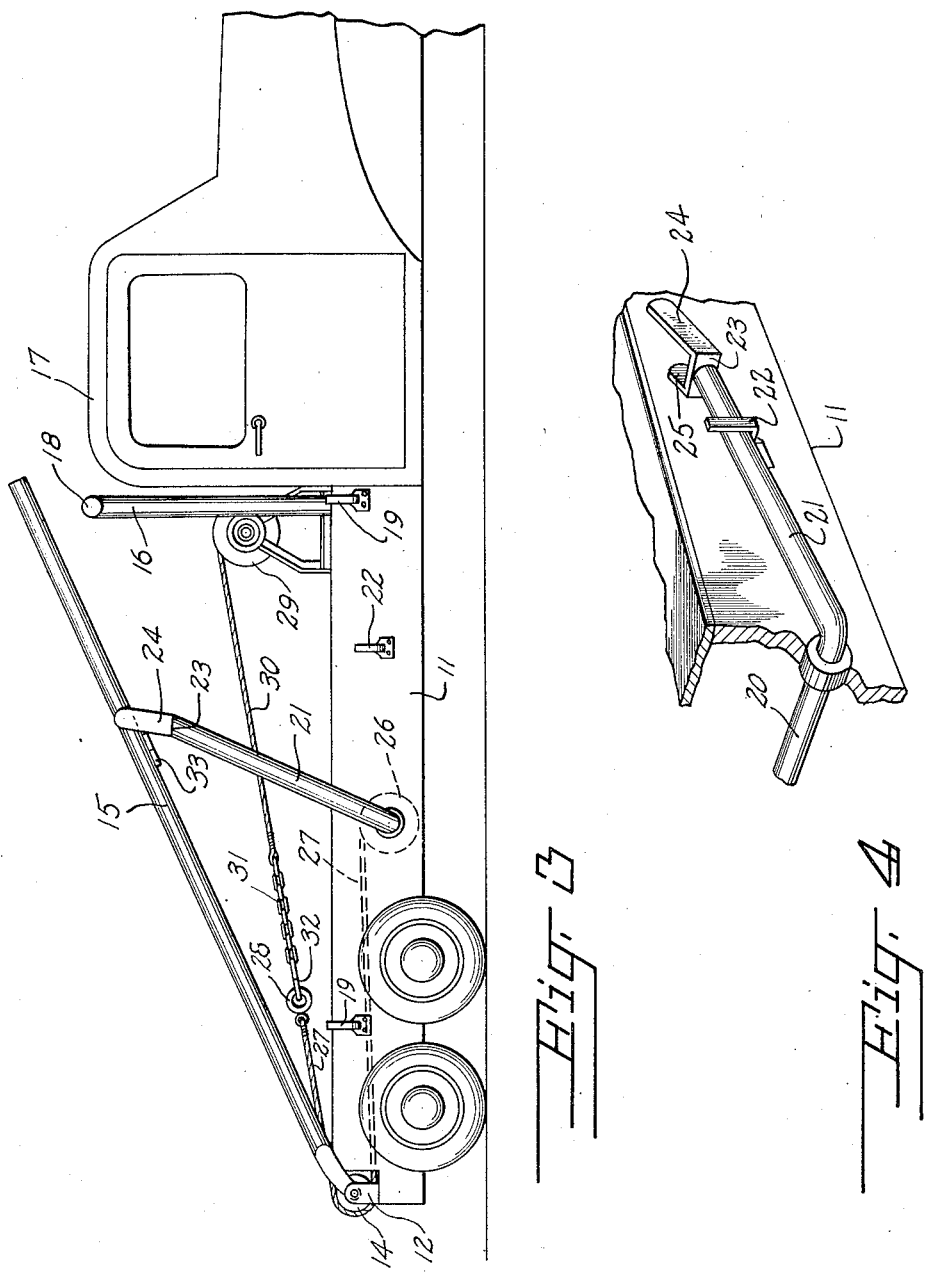
Figure 3 is a side elevational view similar to Figure 2, but showing the gin poles elevated by the structure of the present invention to positions wherein they are about to be moved inwardly onto the headache rack of the truck.
Figure 4 is an enlarged perspective detail view of one of the gin poles elevating arms employed in the present invention, the arm being shown in inoperative position supported at the side of the truck body.

In traversing hoist mechanisms of the truck mounted type, there are frequently employed swingable side booms or "gin poles" which are normally carried in inoperative positions of the sides of the truck body, said poles being pivotally connected to the sides of the truck body at one end thereof, for example, the rear end of the body. In order to set up the hoist mechanism, the gin poles must be elevated and connected at their free ends by a hanger member, or the like, which ordinarily carries a sheave or block over which the hoist cable is passed. The gin poles are very heavy, and are very dangerous when dropped. In the conventional method of procedure, the gin poles are raised separately by hand onto a transverse rack, known as a "headache rack" mounted on the truck body adjacent the driver's cab. After the gin poles are lifted onto the headache rack they are moved inwardly towards each other and the hanger member is secured to the free ends of the poles.

Raising the gin poles by hand is a slow and tedious operation, and is extremely hazardous to the operators, since they may sustain serious injuries if the gin poles are dropped during this process. The present invention has for its major purpose to elevate the gin poles by mechanical means onto the headache rack, thus speeding up the operation on eliminating risk of injury to the truck crew.

Referring to the drawings, 11 designates a truck body. Journaled in upstanding brackets 12, 12 at the rear end of the body 11 is a shaft 13 carrying a roller 14. Pivoted to the end portions of shaft 13 inwardly adjacent the brackets 12, 12 are the rear ends of respective gin poles 15, 15, said gin poles being rotatable inwardly as well as upwardly on the shaft end portions. Secured to the top ends of vertical posts 16 located adjacent the driver's cab 17 is a transverse bar 18, known as a "headache rack." When the gin poles are not in use they are supported in longitudinal inoperative positions in brackets 19 secured to the sides of the truck body.

Pivoted to the intermediate portion of the truck body 11 is a transverse shaft 20 having respective end arms 21, 21 which normally extend forwardly and underlie the forward portions of the gin poles 15, 15, said arms 21, 21 being supported in brackets 22 secured to the sides of the truck body beneath the gin poles. Each arm 21 has secured to its free end a U-shaped member 23 having a relatively long outer arm 24 and a relatively short inner arm 25. When the shaft 20 is rotated counter-clockwise, as viewed in Figure 2, the gin poles are engaged between the arms 24 and 25 and are elevated as the side arms 21, 21 are rotated upwardly.

Shaft 20 carried a drum 26 on which is wound a cable 27. Cable 27 extends rearwardly and passes over the roller 14. To the end of cable 27 is secured a ring member 28. The truck body carries at its forward end a conventional winch operated by the truck motor and including a cable drum 29 on which is wound a cable 30. Secured to the end of cable 30 is a chain 31 provided at its end with a hook 32. When the gin poles are to be elevated the hook 32 is engaged in the ring member 28, whereby cable 27 will be placed in tension by cable 30 when the winch is operated, causing drum 26 and shaft 20 to be rotated counter-clockwise, as viewed in Figure 2, as cable 27 unwinds from drum 26.

Secured to the underside of each gin pole between the forward end of the gin pole and the transverse plane of shaft 20 is a triangular plate 33. The apex of each plate 33 projects outwardly a substantial distance, as shown in Figure 1.

The ends of the headache rack 18 are normally spaced inwardly of the longitudinal planes of the gin poles 15, 15. As the gin poles are elevated above the headache rack 18, as shown in Figure 3, the forward inclined edges of the triangular plates 33, 33 are engaged by the respective outer arms 24 of the U-shaped members 23 and elevate the gin poles above the respective inner arms 25 of said U-shaped members and at the same time develop an inward thrust on each gin pole, rotating the gin poles inwardly into overlying positions with respect to the end portions of the headache rack 18. The pin poles then become disengaged from the U-shaped members 23 and drop onto the headache rack 18. The free ends of the gin poles may then be connected to a hanger member as above described. As soon as the gin poles are supported on the headache rack 18, the winch drum 29 may be released, allowing the arms 21, 21 to return to their normal positions.

It is thus seen that the gin poles are elevated and positioned on the headache rack 18 without manual effort, and that the desired operation may be rapidly and safely accomplished.

While a specific embodiment of a mechanical gin pole elevating device for hoist trucks has been disclosed in the foregoing description, various modifications within the spirit of the invention may occur to those skilled in the art. Therefore, it is intended that no limitations be placed on the invention except as defined by the scope of the appended claims.

What is claimed is:

1. In a hoist truck, a pair of gin poles pivotally connected to the body of the truck at one end thereof and being transversely spaced with respect to said end, an elevated horizontal transverse bar member secured to the truck body adjacent the other end of said body, the ends of said transverse bar member being spaced inwardly from the respective vertical longitudinal planes of said gin poles when the poles are in horizontal parallel positions, means for elevating said gin poles above the plane of said transverse bar member, and cooperating cam means carried by said gin poles and the elevating means for moving the gin poles laterally inwardly onto said transverse bar member and out of engagement with said elevating means responsive to continued elevating movement of the gin poles to predetermined angles of elevation by said elevating means.

2. In a hoist truck, a pair of gin poles pivotally connected to the rear end of the truck body at the respective sides thereof and being movable upwardly and inwardly with respect to the truck body, an elevated horizontal transverse bar member secured to the truck body adjacent the forward end of said body, the ends of said transverse bar member being inwardly adjacent to the respective vertical longitudinal planes of said gin poles when the poles are in horizontal parallel positions, jack means on the truck body and engaging the under surfaces of the gin poles, an outwardly projecting cam plate secured to the under surface of each gin pole, and means carried by the jack means and engageable with the cam plates to move the gin poles laterally inwardly off of the jack means and onto said transverse bar member responsive to the elevation of the gin poles above the horizontal transverse bar member by said jack means.

3. In a hoist truck, a pair of gin poles pivotally connected to the rear end of the truck body at the respective sides thereof and being movable upwardly and inwardly with respect to the truck body, an elevated horizontal transverse bar member secured to the truck body adjacent the forward end of said body, the ends of the transverse bar member being inwardly adjacent to but spaced from the respective vertical longitudinal planes of said gin poles when the poles are in parallel horizontal positions, a transverse shaft journaled in the truck body, side arms carried by said shaft and extending longitudinally forwardly and beneath the gin poles, a U-shaped member secured to the end of each side arm and engageable with its overlying gin pole, and an outwardly projecting cam plate secured to the under surface of each gin pole and cooperative with the U-shaped member engaging the gin pole to move the gin pole relatively upwardly and laterally inwardly off of the U-shaped member and onto the horizontal bar member responsive to the upward rotation of said side arms.

4. In a hoist truck, a pair of gin poles pivotally connected to the rear end of the truck body at the respective sides thereof and being movable upwardly and inwardly with respect to the truck body, a transverse vertical frame secured to the truck body adjacent the driver's cab and having a transverse horizontal top element, the ends of said top element being inwardly adjacent to but spaced from the respective vertical longitudinal planes of said gin poles when the poles are in parallel horizontal positions, a transverse shaft journaled in the truck body, means carried by the truck for rotating said shaft, side arms carried by said shaft and extending longitudinally forwardly and beneath the gin poles, a U-shaped member secured to the end of each side arm and engageable with its overlying gin pole, and a triangular cam plate secured to the under surface of each gin pole, the apex of the plate projecting outwardly from the pole and cooperable with the U-shaped member engaging the pole to move the pole inwardly off the U-shaped member and onto the transverse horizontal top element responsive to the upward rotation of said side arms.

5. In a hoist truck, a pair of gin poles pivotally connected to the rear end of the truck body at the respective sides thereof and being movable upwardly and inwardly with respect to the truck body, a transverse vertical frame secured to the truck body adjacent the driver's cab and having a transverse horizontal top element, the ends of said top element being inwardly adjacent to but spaced from the respective vertical longitudinal planes of said gin poles when the poles are in parallel horizontal positions, a transverse shaft journaled in the truck body, means carried by the truck for rotating said shaft, side arms carried by said shaft and extending longitudinally forwardly and beneath the gin poles, a U-shaped member secured to the end of each side arm and engageable with its overlying gin pole, said U-shaped member having a relatively short inner leg and a relatively long outer leg, and a triangular plate secured to the under surface of each gin pole, the apex of the plate projecting outwardly from the pole and cooperable with said long outer leg to move the pole inwardly off the U-shaped member and onto the transverse horizontal top element responsive to the upward rotation of said side arms.

6. In a hoist truck, including a pair of gin poles pivotally connected to the body of the truck at one end thereof and being transversely spaced with respect to said end, an elevated horizontal support secured to the truck body adjacent the other end of said body, the ends of said support being spaced inwardly from the respective vertical longitudinal planes of said gin poles when the poles are in horizontal parallel positions, the improvement comprising means for simultaneously elevationg both of said gin poles above the plane of said transverse support, cooperating cam means on said poles and elevating means for automatically and simultaneously moving both gin poles laterally inwardly onto said support responsive to continued elevating movement of said elevating means above the plane of said support.

MOZEL A. ADAMS.

REFERENCES CITED

The following references are of record in the file of this patent:

UNITED STATES PATENTS

| Number | Name | Date |
|---|---|---|
| 1,365,097 | Garbeth | Jan. 11, 1921 |
| 1,533,436 | Lowry | Apr. 14, 1925 |
| 2,181,253 | Willis | Nov. 28, 1939 |
| 2,190,258 | Colorigh | Feb. 13, 1940 |